3,380,951
SOLUTIONS OF POLY(ARYLENE SULFIDES)
David A. Frey, Woodstock, Ill., assignor to Phillips
Petroleum Company, a corporation of Delaware
No Drawing. Filed June 29, 1965, Ser. No. 468,158
14 Claims. (Cl. 260—33.6)

ABSTRACT OF THE DISCLOSURE

Poly(arylene sulfides) are dissolved in polyphenyl compounds.

---

This invention relates to the treatment of poly(arylene sulfides).

In one of its aspects, this invention relates to the dissolution of poly(arylene sulfides) with polyphenyl compounds.

Poly(arylene sulfides) such as, for example, poly(p-phenylene sulfide) have heretofore been known to be nearly insoluble in common organic solvents. Due to the insolubility of the poly(arylene sulfides), there has been considerable difficulty in purification and characterization of these polymers. Furthermore, the solution casting of such polymers requires the use of a solvent which can dissolve an appreciable amount of polymer. Studies by other investigators have shown the solubility of phenylene sulfide polymers to be 0.0 percent in solvents such as refluxing pyridine, refluxing 2,4-lutidine, refluxing toluene, and refluxing o-dichlorobenzene. Since the solubility of poly(arylene sulfides) has been limited, use of these polymers has been limited to a considerable extent.

I have now found that the disadvantages in the prior art can be overcome by the practice of my invention.

By various aspects of this invention, one or more of the following, or other, objects can be obtained.

It is an object of this invention to obtain a solution of poly(arylene sulfides) in a solvent.

It is a further object of this invention to provide a solution of poly(arylene sulfides) which can be cast into films.

Another object of this invention is to provide a method for applying a coating of poly(arylene sulfide).

Yet another object of this invention is to provide a method for molecular weight determination of poly(arylene sulfide) polymers.

Other aspects, objects, and the several advantages of this invention are apparent from a study of this disclosure and the appended claims.

In accordance with the practice of this invention, there is provided a method for the dissolution of a poly(arylene sulfide) polymer by admixing the polymer with a polyphenyl having the formula

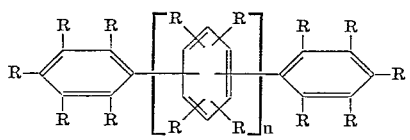

where $n$ is an integer selected from the group consisting of 0 and 1 and R is at least one member selected from the group consisting of hydrogen, halogen, methyl radicals, and ethyl radicals, the total number of carbon atoms in all of said methyl radicals and ethyl radicals being within the range of 0–6.

When halogenated biphenyls or halogenated terphenyls are used, the halogenated biphenyl can have 1–10 halogen atoms per molecule, and each of the halogenated terphenyls can have 1–14 halogen atoms per molecule. Although the halogen in the halogenated biphenyl and halogenated terphenyls can be fluorine, chlorine, bromine, or iodine, it is preferable that the halogen be chlorine or bromine, chlorine being the halogen of choice. Particularly useful halogenated biphenyl and halogenated terphenyls are the chlorinated biphenyl and chlorinated terphenyls.

Examples of the polyphenyl compounds which are useful in this invention are:

biphenyl
o-terphenyl
m-terphenyl
p-terphenyl
2-methylbiphenyl
3-ethylbiphenyl
4,4'-dimethylbiphenyl
2,2'-dimethyl-4,4'-diethylbiphenyl
3-methyl-o-terphenyl
4-methyl-m-terphenyl
2-methyl-p-terphenyl
3-ethyl-m-terphenyl
2,3''-dimethyl-p-terphenyl
3-methyl-4'-ethyl-o-terphenyl
2,2'',5'-triethyl-m-terphenyl
3-chlorobiphenyl
4-bromobiphenyl
2-methyl-4-iodobiphenyl
3-ethyl-4-fluorobiphenyl
2,4-dichlorobiphenyl
3,3'-dibromobiphenyl
2,2'-dichloro-4,4'-dibromobiphenyl
2,2',4,4',5,5'-hexachlorobiphenyl
2,2',3,3',4,4',5,5',6,6'-decachlorobiphenyl
2-chloro-o-terphenyl
4-bromo-p-terphenyl
3-fluoro-m-terphenyl
2-methyl-3-chloro-p-terphenyl
5'-ethyl-2,2''-diiodo-m-terphenyl
3,3''-dibromo-4'-chloro-o-terphenyl
2,2',2'',5,5',5''-hexachloro-m-terphenyl
2,2'',3,3'', 4,4',4'',5,5',5''-decachloro-o-terphenyl
2,2',2'',3,3''4,4',4'',5,5',5'',6,6',6''-tetradecachloro-m-terphenyl The foregoing biphenyl, the terphenyls, halogenated biphenyl, and the halogenated terphenyls and methyl and ethyl derivatives of biphenyl and the terphenyls can be used as solvents for poly(arylene sulfides) generally. They are particularly useful as solvents for poly(arylene sulfides) prepared by the reaction of polyhalo-substituted aromatic compounds with alkali metal sulfides. The preparation of these compounds is disclosed in copending application Ser. No. 327,143, filed Nov. 27, 1963. Some of these poly(arylene sulfides), e.g., poly(p-phenylene sulfide) and poly(4,4'-biphenlylene sulfide), are of especially low solubility in the usual organic solvents. The solubility of such polymers is substantially greater in the solvents of this invention. The polymers of especially low solubility can be dissolved in the solvents of this invention at elevated temperatures. Thus, to effect solution of such polymers, the solvents, all of which boil above 250° C. at atmospheric pressure, can be preferably employed at temperatures above 200° C. When greater solubility is desired, it is often advantageous to use temperatures above 240° C. The solution can then be cooled to effect precipitation of the polymer.

The method of this invention can be applied not only to homopolymers such as poly(phenylene sulfide) and the like but also to other poly(arylene sulfides) such as poly(arylene sulfide) copolymers, poly(arylene sulfide) terpolymers, and the like.

The use of the solvents in accordance with this invention provides a means for obtaining solutions of poly (arylene sulfides), thereby facilitating purification and characterization of the polymers, as well as making possible the solution casting of polymers. For example, it is possible in accordance with the practice of this invention to apply a coating of poly(arylene sulfide) polymer to various articles. It is also possible in accordance with the practice of this invention to obtain a solution of poly (arylene sulfide) polymers for the laboratory determination of the inherent viscosity of the poly(arylene sulfide) polymer and for the determination of molecular weight of the polymer by measurement of the boiling point elevation. It will be readily apparent to one skilled in the art that other advantages can be obtained and are within the scope of the invention.

The invention will be more completely described with reference to the following specific examples.

Example I

A mixture of 720 grams of sodium sulfide nonahydrates and 1 liter of N-methylpyrrolidone was heated until 605 grams of distillate was obtained. This preliminary heating was for the purpose of removing water of hydration from the sodium sulfide. The residual material was then transferred to a rocking autoclave, in which it was heated with 463 grams of p-dichlorobenzene for 13 hours at 450° F. (232° C.) and for four hours at 500–530° F. (260–277° C.). The reaction mixture was cooled, and the solid was filtered. The solid was washed three times with cyclohexane, followed by three washings with water. The solid was then dried overnight under vacuum at 125° C., giving 314 grams of dry poly(p-phenylene sulfide).

Example II

A stirred mixture of 50 grams of biphenyl and 1.5 grams of the poly(p-phenylene sulfide) prepared in Example I was heated to reflux temperature, whereupon the polymer was completely dissolved. An additional 8.5 grams of poly(p-phenylene sulfide) was added to the refluxing solution, all of the polymer going into solution. Precipitation of polymer occurred when the solution was allowed to cool to 210–215° C. The polymer redissolved when the resulting mixture was heated to 235–240° C.

Example III

A mixture of 50 grams of m-terphenyl and 2.5 grams of the poly(p-phenylene sulfide) prepared in Example I was heated. The poly(p-phenylene sulfide) completely dissolved at a temperature below the boiling point of m-terphenyl.

Example IV

A mixture of 249.8 grams of sodium sulfide nonahydrate and 1 liter of N-methylpyrrolidone was heated to a temperature of 190° C. to remove water from the hydrate. The residual material was then transferred to a rocking autoclave, in which it was heated with 147 grams of p-dichlorobenzene for three hours at 300° C. The reaction mixture was then worked up to give the desired poly(p-phenylene sulfide).

Example V

A mixture of 100 grams of Aroclor 1242 (chlorinated biphenyl, containing approximately 42 weight percent chlorine) and 10 grams of poly(p-phenylene sulfide) prepared in Example IV was heated. The poly(p-phenylene sulfide) dissolved before the mixture had reached reflux temperature. The polymer precipitated when the mixture was cooled to room temperature.

Example VI

A mixture of 240 grams of sodium sulfide nonahydrate and one liter of N-methylpyrrolidone was heated until 217 grams of distillate was obtained to remove water of hydration from the sodium sulfide. The residual material was then transferred to an autoclave, in which it was heated with 312 grams of 4,4'-dibromobiphenyl for three hours at 500° F. The resulting polymer was filtered, washed four times with water and four times with acetone, and dried. The dry polymer, poly(4,4'-biphenylylene sulfide), weighed 172 grams.

Example VII

A mixture of 10 grams of Aroclor 1232 (chlorinated biphenyl containing approximately 32 weight percent chlorine) and 0.1 gram of the poly(4,4'-biphenylylene sulfide) prepared in Example VI was heated to reflux temperature. All of the polymer dissolved.

Example VIII

A mixture of 10 grams of m-terphenyl and 0.1 gram of the poly(4,4'-biphenylylene sulfide) prepared in Example VI was heated to reflux temperature, whereupon all of the polymer was dissolved.

Reasonable variation and modification are possible within the scope of the foregoing disclosure, the appended claims to the invention, the essence of which is that there has been provided a method for the treatment of poly (arylene sulfides) in which the poly(arylene sulfides) can, for example, be dissolved with materials which are solvents therefor.

I claim:

1. The method of dissolving poly(arylene sulfide) comprising contacting said poly(arylene sulfide) with a polyphenyl having the formula

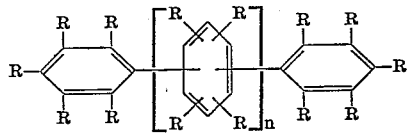

where $n$ is an integer selected from the group consisting of 0 and 1 and R is at least one member selected from the group consisting of hydrogen, halogen, methyl radicals, and ethyl radicals, the total number of carbon atoms in all of said methyl radicals and ethyl radicals being within the range of 0–6.

2. The method of dissolving poly(arylene sulfide) comprising contacting said poly(arylene sulfide) with a compound selected from halogenated biphenyl having 1–10 halogen atoms per molecule, and halogenated terphenyls having 1–14 halogen atoms per molecule.

3. The method of claim 1 wherein said poly(arylene sulfide) is contacted with said polyphenyl compound at a temperature above about 200° C.

4. The method of claim 1 wherein said poly(arylene sulfide) is poly(p-phenylene sulfide) and said polyphenyl compound is biphenyl.

5. The method of claim 1 wherein said poly(arylene sulfide) is selected from poly(p-phenylene sulfide), and poly(4,4'-biphenylene sulfide).

6. The method of claim 2 wherein said poly(arylene sulfide) is contacted with said compound at a temperature above about 200° C.

7. The method of claim 4 wherein said poly(p-phenylene sulfide) is contacted with said biphenyl at a temperature above about 235° C.

8. The method of claim 5 wherein said poly(arylene sulfide) is contacted with said polyphenyl compound at a temperature above about 200° C.

9. A solution comprising poly(arylene sulfide) and a polyphenyl compound having the formula of the polyphenyl compounds in claim 1.

10. The solution of claim 9 wherein said polyphenyl compound is selected from the group consisting of biphenyl, o-terphenyl, m-terphenyl, p-terphenyl, halogenated biphenyl, halogenated o-terphenyl, halogenated m-terphenyl, halogenated p-terphenyl, methyl and ethyl derivatives of biphenyl and o-, m-, and p-terphenyl, and mixtures thereof.

11. A solution comprising poly(arylene sulfide) and a halogenated polyphenyl compound having the formula of the polyphenyl compounds in claim 1.

12. The solution of claim 11 wherein said halogenated polyphenyl compound is a compound selected from chlorinated biphenyl having 1–10 halogen atoms per molecule, and chlorinated terphenyls having 1–14 halogen atoms per molecule.

13. A solution comprising poly(p-phenylene sulfide) and a compound selected from biphenyl, chlorinated biphenyl, and m-terphenyl.

14. A solution comprising poly(4,4′-biphenylene sulfide) and a compound selected from chlorinated biphenyl and m-terphenyl.

References Cited
UNITED STATES PATENTS

| | | | |
|---|---|---|---|
| 2,538,941 | 1/1951 | Macallum | 260—79.1 |
| 2,744,094 | 5/1956 | Caldwell | 260—33.6 |
| 3,248,325 | 4/1966 | Graham | 260—79.1 |
| 3,268,504 | 8/1966 | Harris et al. | 260—79.1 |

MORRIS LIEBMAN, *Primary Examiner.*

L. T. JACOBS, *Assistant Examiner.*